(12) United States Patent
De Domenico et al.

(10) Patent No.: US 11,601,876 B2
(45) Date of Patent: Mar. 7, 2023

(54) METHOD FOR CONTROLLING THE ADMISSION OF SLICES INTO A VIRTUALIZED TELECOMMUNICATION NETWORK AND THE CONGESTION LIKELY TO BE GENERATED BETWEEN SERVICES INSTANTIATED ON SAID SLICES

(71) Applicant: COMMISSARIAT A L'ENERGIE ATOMIQUE ET AUX ENERGIES ALTERNATIVES, Paris (FR)

(72) Inventors: Antonio De Domenico, Grenoble (FR); Ghina Dandachi, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 7 days.

(21) Appl. No.: 17/064,736

(22) Filed: Oct. 7, 2020

(65) Prior Publication Data
US 2021/0153112 A1    May 20, 2021

(30) Foreign Application Priority Data
Oct. 10, 2019    (FR) .................................... 19 11264

(51) Int. Cl.
*H04L 12/28*    (2006.01)
*H04W 48/18*    (2009.01)
(Continued)

(52) U.S. Cl.
CPC .......... *H04W 48/18* (2013.01); *G06K 9/6262* (2013.01); *G06N 20/00* (2019.01); *H04W 24/02* (2013.01); *H04W 28/06* (2013.01); *H04W 28/24* (2013.01)

(58) Field of Classification Search
CPC . H04L 45/00; H04L 29/0653; H04L 49/3009; H04L 47/10; H04L 29/06;
(Continued)

(56) References Cited

U.S. PATENT DOCUMENTS 11,218,211 B2 *   1/2022   Denis .................... H04B 7/0695
2018/0316564 A1 * 11/2018  Senarath ............. H04L 41/5006
(Continued)

FOREIGN PATENT DOCUMENTS

CN      109743217 A        5/2019
EP        3806402 A1 *     4/2021  ........... G06K 9/6262

OTHER PUBLICATIONS

Mourice O. Ojijo and Olabisi E. Falowo, A Survey on Slice Admission Control Strategies and Optimization Schemes in 5G Network, Dec. 23, 2019, IEEE Access, Open Access Journal, pp. 14977-14990. (Year: 2019).*

(Continued)

*Primary Examiner* — Phuongchau Ba Nguyen
(74) *Attorney, Agent, or Firm* — Oblon, McClelland, Maier & Neustadt, L.L.P.

(57) ABSTRACT

A method for controlling the admission of slices in a virtualized telecommunication network and the congestion generated between services with different priorities instantiated on the slices and likely to share a given quantity of resources comprising the following steps of:
  defining a priority scale to be assigned to the network slices,
  defining a low priority threshold,
  determining the quantity of available and used network resources $s_p(t)$ and $x_p(t)$,
  determining the quantity of resources allocated to slices with a priority lower than the low priority threshold and which may be temporarily assigned to new slices with a priority higher than the threshold, and
(Continued)

determining the slices likely to be accepted into the network, taking into account the available resources and the priority of the slices.

8 Claims, 6 Drawing Sheets

(51) Int. Cl.
*G06N 20/00* (2019.01)
*G06K 9/62* (2022.01)
*H04W 24/02* (2009.01)
*H04W 28/06* (2009.01)
*H04W 28/24* (2009.01)

(58) Field of Classification Search
CPC ........... H04L 41/5022; H04L 41/0896; H04W 48/18; H04W 24/02; H04W 28/06; H04W 28/24; G06K 9/6262; G06N 20/00
See application file for complete search history.

(56) References Cited

U.S. PATENT DOCUMENTS

| | | | | |
|---|---|---|---|---|
| 2018/0317133 | A1* | 11/2018 | Sciancalepore | H04W 24/02 |
| 2019/0173803 | A1 | 6/2019 | Singh et al. | |
| 2019/0281494 | A1* | 9/2019 | Chan | H04W 24/08 |
| 2020/0296631 | A1* | 9/2020 | Young | H04W 16/02 |
| 2020/0367109 | A1* | 11/2020 | Chen | H04W 28/18 |
| 2021/0153069 | A1* | 5/2021 | De Domenico | H04W 24/02 |
| 2021/0185601 | A1* | 6/2021 | Altay | H04L 47/805 |
| 2021/0211942 | A1* | 7/2021 | Guo | H04W 72/087 |
| 2021/0329464 | A1* | 10/2021 | Xing | H04W 16/02 |
| 2021/0360447 | A1* | 11/2021 | Bor-Yaliniz | H04W 24/02 |
| 2021/0367109 | A1* | 11/2021 | Song | H01L 33/20 |
| 2022/0141664 | A1* | 5/2022 | Huang | H04W 24/02 726/3 |

OTHER PUBLICATIONS

An et al, Slice Management for Quality of Service Differentiation in Wireless Network Slicing, MDPI, Sensors, Jun. 19, 2019, pp. 1-19 (Year: 2019).*

French Preliminary Search Report dated May 26, 2020 in French Application 19 11264 filed one Oct. 10, 2019 (with English Translation of Categories of Cited Documents), 3 pages.

U.S. Appl. No. 16/681,973, filed Nov. 13, 2019, 2020/0162930 A1, Miscopein, B, et al.

* cited by examiner

METHOD FOR CONTROLLING THE ADMISSION OF SLICES INTO A VIRTUALIZED TELECOMMUNICATION NETWORK AND THE CONGESTION LIKELY TO BE GENERATED BETWEEN SERVICES INSTANTIATED ON SAID SLICES

TECHNICAL FIELD

The invention is in the field of virtualized telecommunication networks and more specifically relates to a method for controlling the admission of slices in a virtualized telecommunication network having a core network and a radio access network RAN and the congestion generated by services having different priorities instantiated on said slices and likely to share a given quantity of resources.

The invention also relates to a computer program stored on a recording medium and including instructions for implementing the method when run on a computer.

STATE OF PRIOR ART

Over the last decade, the technological revolution that characterizes mobile telephone networks has changed the way we communicate and led to new applications and services, which will characterize the communication systems fifth generation (5G) and subsequent developments.

These new applications and services are gathered into three case of use classes, each characterized by specific requirements and Key Performance Indicators (KPIs):
- Ultra-reliable, low-latency communications (URLLC),
- Massive machine-type communications (mMTC),
- Enhanced Mobile Broadband (eMBB).

Figure 1:
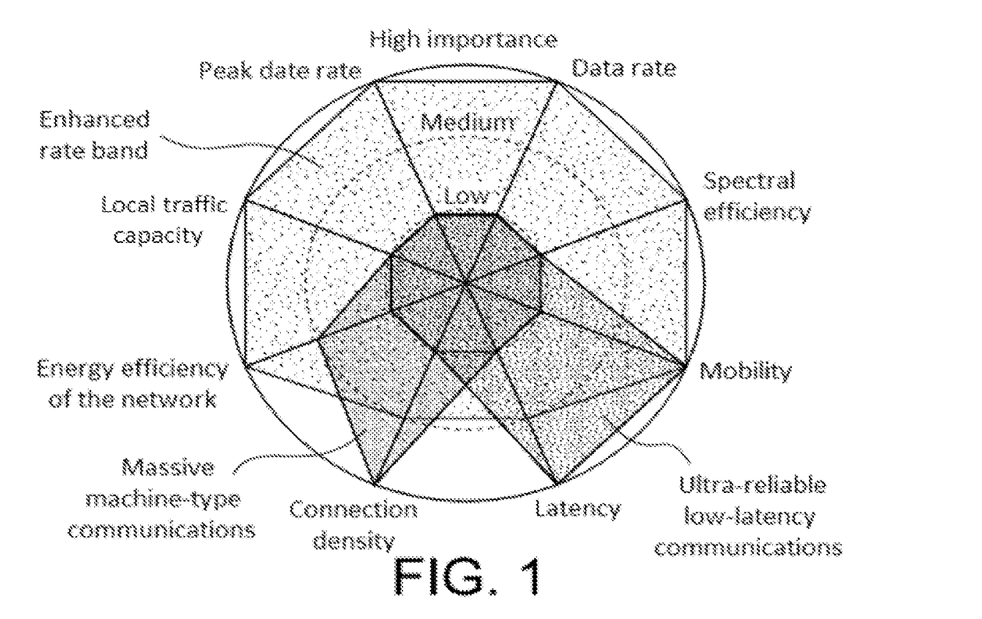
FIG. 1 illustrates the correspondence between new applications and services and the requirements associated with these new applications and services in 5G communication systems, FIG. 2 schematically illustrates the network slice concept.
Figure 2:
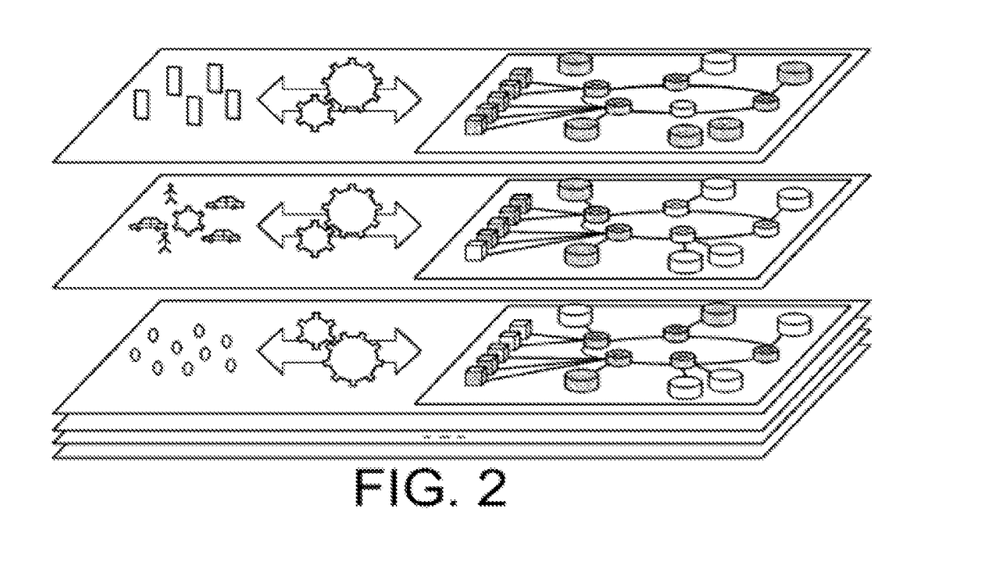

FIG. 1 illustrates the correspondence between these cases of use and requirements associated therewith. To effectively support cases of use and applications with heterogeneous requirements, 5G and later communication systems will instantiate a new and flexible architecture in which the network infrastructure is logically divided into different instances, i.e. network slices, each designed for a specific service running in the cloud environment. A network slice consists of Physical Network Functions (PNF) and Virtual Network Functions (VNF). A VNF represents the software implementation, i.e. operating in a cloud environment, of traditional functions such as routing or packet scheduling. The network slice concept is schematically illustrated in FIG. 2. The main standardization body for network slicing is the 3GPP (Third Generation Partnership Project). Its specifications detail the network functionalities and their sequencing to provide these slices on the Radio Access Network (RAN) and the Core Network (CN) [3GPPTS28.531].

In addition to designing the access and core functions, one of the most difficult tasks is to transition from a fixed-capacity OSS (Operating Support System) and BSS (Business Support System) to a new hierarchy of elements that have to deal with a very complex ecosystem, both from the point of view of network users, network slices, and services that generally have different throughput and quality of service requirements.

In addition to management, future 5G and subsequent networks will require orchestration capacities, which are divided into two main categories, service orchestration and resource orchestration. Tasks such as sharing a VNF between network slices, their location in a highly heterogeneous cloud infrastructure or the number of allocated core processors are just a few examples of the responsibilities of the M&O, Management and Orchestration, function.

Functions related to the lifecycle management of virtual network functions VNFs and the orchestration of their resources go beyond the responsibility of the 3GPP group. The standardization body in charge of defining these functions is the European Telecommunications Standards Institute (ETSI), more precisely the Network Function Standardization Group (NFV) (for Network Function Virtualization) [ETSIGR].

Figure 3:
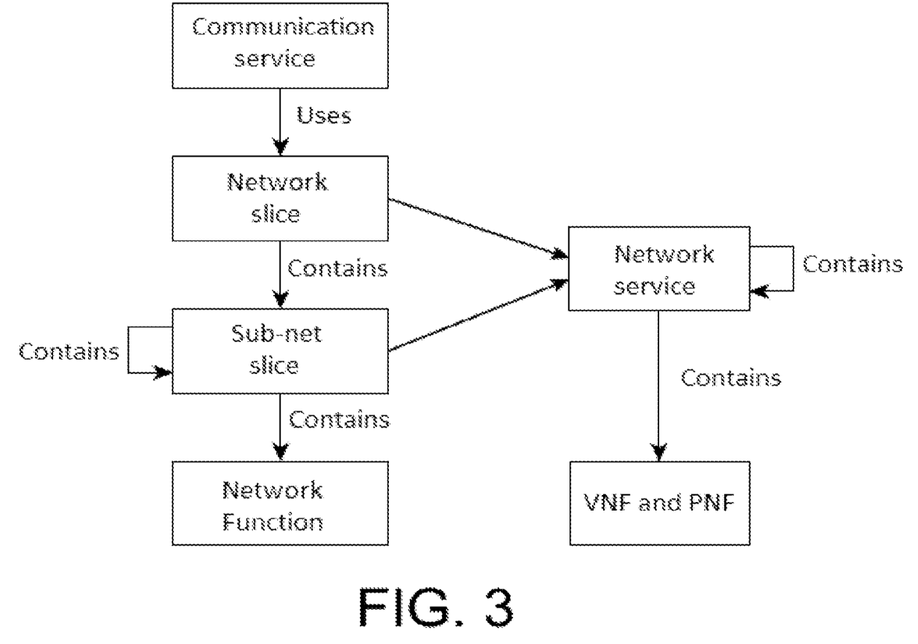
FIG. 3 illustrates the correspondence between 3GPP network slices and the ETSI NFV (European Telecommunication Standard Institute, Network Functions Virtualization) concepts.
Figure 4:
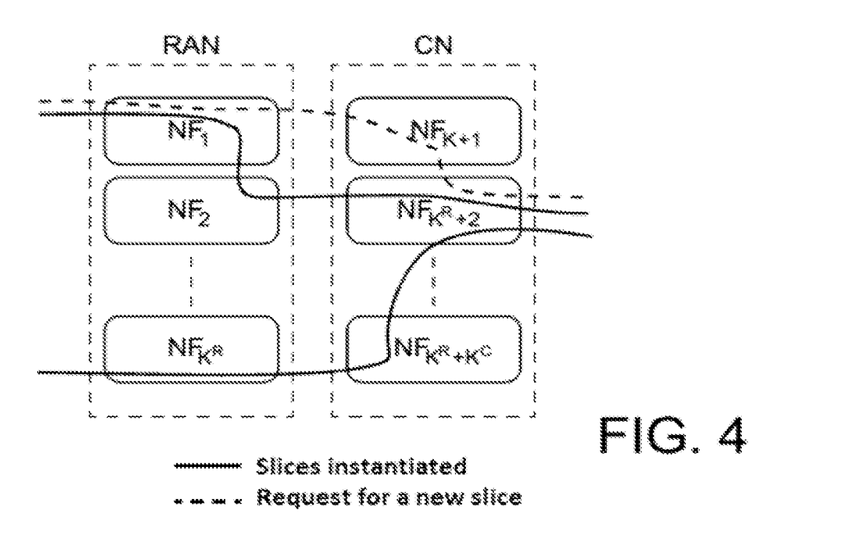
FIG. 4 represents the correspondence of services to the required network functions.
Figure 5:
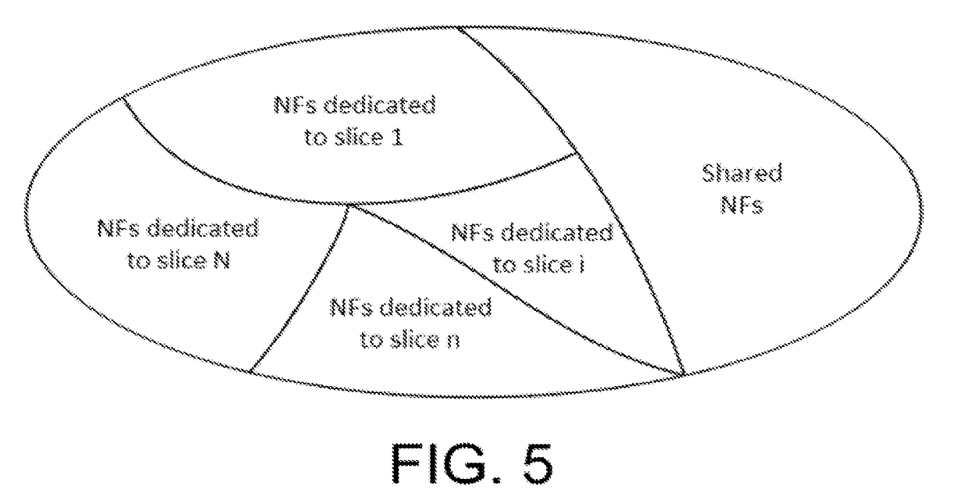
FIG. 5 represents an illustration of shared network functions and dedicated network functions in a network slice instance (NSI) that enables the simultaneous implementation of multiple services.

FIG. 3 shows the correspondence between 3GPP network slices and concepts introduced by ETSI NFV. A network slice is seen from ETSI's point of view as a network service. FIG. 4 illustrates the correspondence between network slices and required network functions. A network function can be dedicated to a specific slice or shared between several slices. FIG. 5 schematically illustrates shared network functions and dedicated network functions within a network slice.

According to the 3GPP group, a network slice is a logic network that extends over the radio access network RAN and the core network CN. To manage each domain, the 3GPP group suggests to break down a slice into RAN and CN subnets and defines the Network Slice Management Function (NSMF) and the Network Slice Subnet Management Function (NSSMF). The NSMF is the entity responsible for managing a slice across multiple domains and the NSSMF is the entity responsible for managing slice subnets in a specific domain [3GPPTS28.531]. A slice subnet comprises radio and core network functionalities configured to provide particular behaviour and meet specific requirements. To create and manage a slice, the NSMF (and NSSMFs) use a set of predefined descriptors or a template. Each descriptor, called the Network Slice Template (NST), provides a description of the features and their specific configuration (for example, operating frequency bands). In particular, it describes the list of NFV components that have to be instantiated to configure a network slice instance, as well as other information, such as configurations, life cycle steps, actions, monitoring, rules, service level contracts, etc.

However, these standardization frameworks only define guidelines on architectural aspects (interfaces and requirements) and design principles without providing specific solutions for the configuration and management of network slices, such as the allocation of the necessary resources by the VNF, priority or quality of service management. Consequently, it is necessary to create new schemes and frameworks capable of managing network resources related to radio, transport and cloud domains. In addition, it is necessary to take into account the fact that different slice requests may have different priorities and requirements and therefore network resources have to be managed to ensure cross resource orchestration and management.

To solve the above-mentioned problems a concept of resource elasticity for communication networks has been introduced. This concept defines the ability of the network to adapt to load and other changes of the system automatically, so that the available resources meet request as closely and efficiently as possible. In addition, temporal and spatial fluctuations of the traffic in networks require efficient scaling of network resources: the network has to adapt its operation by possibly redistributing available resources according to needs until network performance is smoothly reduced to cope with excessive peak requests while avoiding abrupt QoS degradation.

Although network elasticity has traditionally been exploited in the context of communication resources (for example when a base station in the network downgrades the QoS for users if communication resources such as spectrum are insufficient), future 5G and later networks have to incorporate the computing aspects of resource elasticity as virtualization and network clouding have become a major challenge. Indeed, unlike previous 4G networks, network slicing requires virtualized 5G and later networks to be able to jointly optimize communication and cloud resources.

Within this context, resource elasticity functions have been suggested in three different dimensions:
1) computational elasticity in designing and scaling VNF (Virtual Network Functions),
2) elasticity dictated by the orchestration obtained by the flexible placement of VNF, and
3) elasticity taking into account the network slicing via cross-resource supply mechanisms.

Research experiments have shown that the most expensive NF (Network Functions) in terms of computing request are those related to coding. Consequently, an algorithm for uplink MAC scheduling has been provided that offers a progressive degradation in the event of sudden load changes that could not be served by the available computational resources. In terms of elasticity dictated by orchestration, the dynamic instantiation of VNFs enables their placement on the cloud infrastructure to be adapted according to the computational and latency requirements of 5G and later services, as well as characteristics and capacities of the cloud nodes.

In addition, work on artificial intelligence for mobile networks has highlighted the importance of introducing intelligence and automation into the admission control function.

However, these solutions do not provide a coordinated solution to admission and congestion control issues for the management and orchestration of slices in a virtualized telecommunications network because they do not take into account the computational and storage resources of the cloud nodes required for the instantiation of network slices, nor the different priorities that characterize the services associated with these network slices.

The purpose of the invention is to provide a solution for controlling in a coordinated manner the admission of new network slices and the congestion of the services instantiated on said slices in order to optimize the use of network resources by said services.

DISCLOSURE OF THE INVENTION

The invention is implemented by means of a cellular network management and orchestration system configured to receive service instantiation requests and to decide the number and type of network slices that can be instantiated/accepted based on priorities, their resource requirements, the presence of other simultaneous requests and available network capacities (which depend on the network slices already instantiated).

Figure 7:
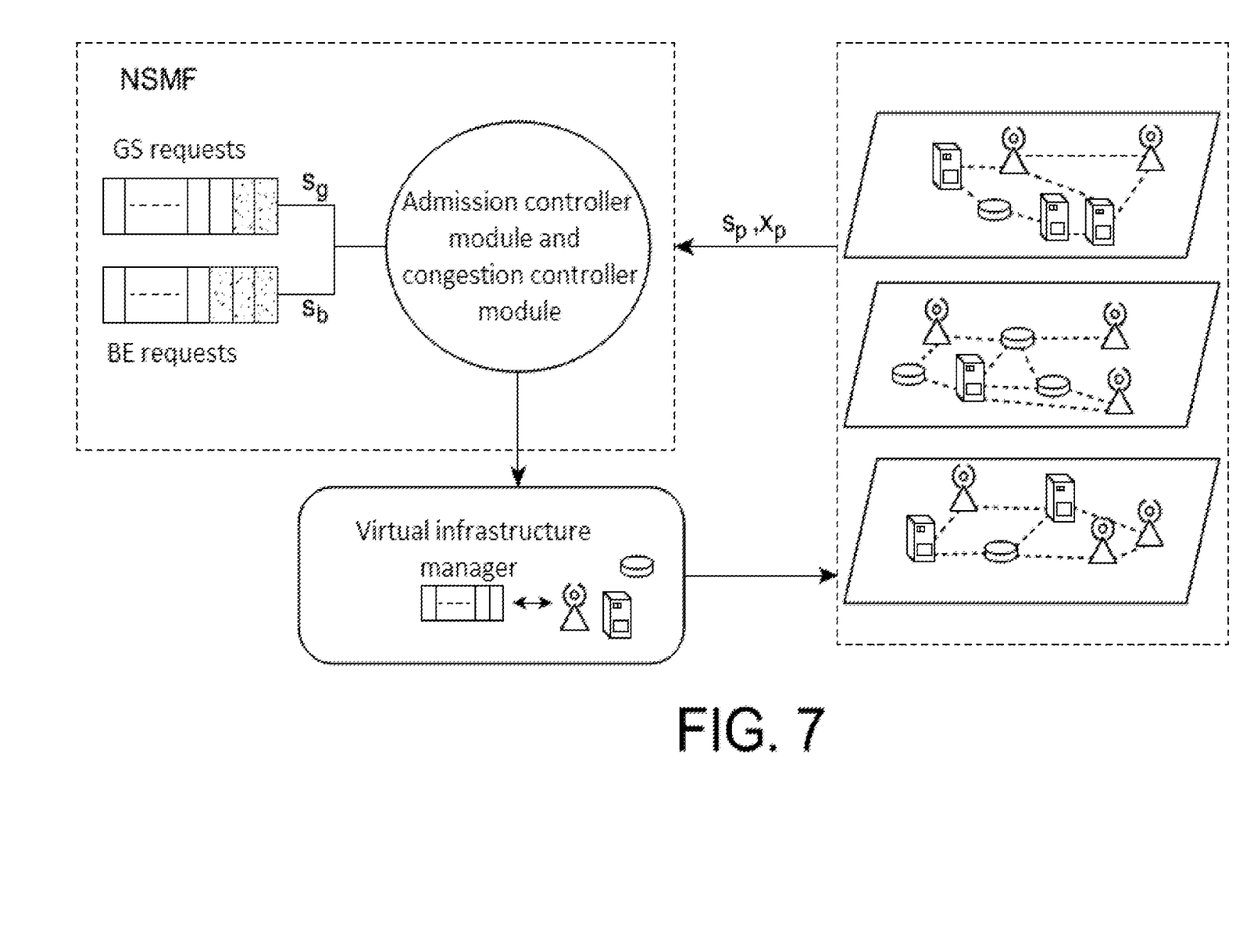
FIG. 7 illustrates a possible functional implementation of the proposed mechanism as a function of the NSMF.

This system is integrated into the NSMF and, in particular, is part of the "Cross-slice M&O" functions that allow the optimization of 5G resources between network slices with heterogeneous QoS requirements (see FIG. 7).

The purpose of the invention is therefore to increase the efficiency of the network, i.e. to increase the efficiency of the 5G system and in particular the income of the system through the cross-optimization of the number and type of network slices that can be instantiated.

This purpose is achieved by means of a method for controlling the admission of slices into a telecommunications network and the congestion generated between services with different priorities.

The method according to the invention comprises the following steps of:
defining a priority scale to be assigned to the network slices,
defining a low priority threshold,
determining the quantity of available and used network resources $s_p(t)$ and $x_p(t)$,
determining the quantity of resources allocated to the slices with a priority lower than the low priority threshold and likely to be temporarily assigned to new slices with a priority higher than said threshold,
determining the slices likely to be accepted into the network taking into account the available resources and priority of the slices.

According to the invention, each logical network slice comprises at least two sets of network functions, i.e. a set of network functions $K^R$ which correspond to the radio access network RAN and a set of network functions $K^C$ which correspond to the core network.

The method according to the invention further comprises a step for controlling a request $S_g(t)$ for admission of at least one slice with Guaranteed Services, GS, and a request $S_b(t)$ for admission of at least one slice with Best Effort, BE, services, and a step for controlling the congestion of the services instantiated on said slices.

The method according to the invention also includes a step consisting in observing at each instant t by means of a congestion controller module the queue of slice requests $S_g(t)$ and $S_b(t)$ as well as the available and used resources $S_p(t)$ et $X_p(t)$, and in reducing the resource allocated to BE slices with priorities below the predefined threshold so as to increase the acceptance by an admission controller module for the GS slices with priorities above the predefined threshold.

The resources quantity reduced to the BE slices is computed so as to maximize the following function:

$$R_C(s(t),a(t))=a_g(t)w_g-(K_r(t)+K_c(t)+K_m(t))l_c,$$

where $a_g(t)$ is the quantity of GS slices accepted by the admission controller, $w_g$ is the income generated by an accepted GS slice, $(K_r(t)+K_c(t)+K_m(t))$ describes the total quantity of communication, computational and storage resources extracted from the BE slices already instantiated to instantiate additional GS slices, and $l_c$ is the associated cost to reduce the resources needed to instantiate said BE slices.

The number of services accepted is computed to maximize the following function:

$$R_A(s(t),a(t))=a_g(t)w_g+a_b(t)w_b-n_d(t)l_d,$$

where $a_g(t)$ is the quantity of GS slices accepted by the admission controller, $a_b(t)$ is the quantity of BE slices accepted by the admission controller, $w_g$ and $w_b$ represent the income for each accepted GS and BE slice, respectively, $l_d$ is the cost of deleting a GS slice request and $n_d(t)$ is the number of GS slices instantaneously abandoned.

Figure 8:
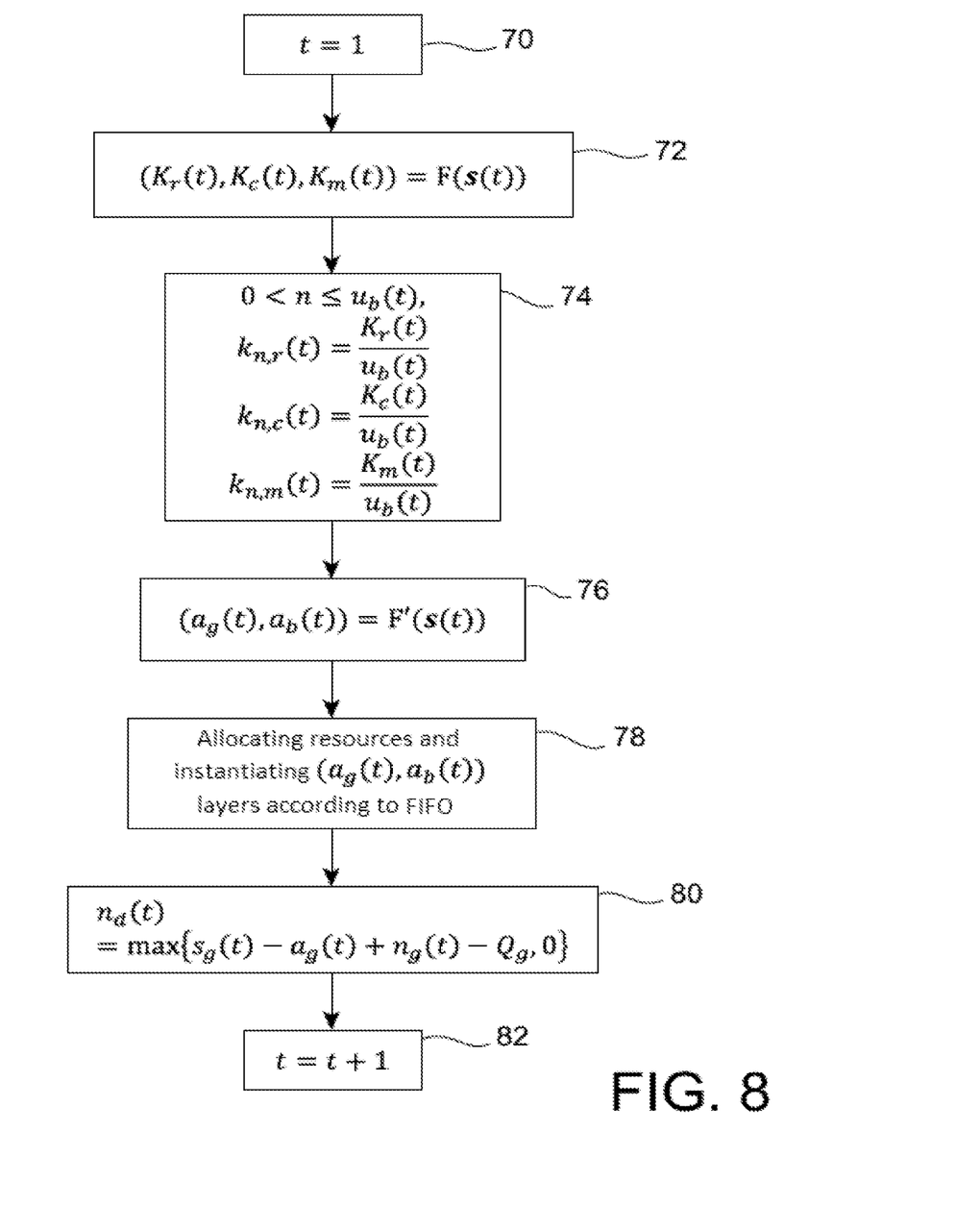
FIG. 8 represents a first flowchart illustrating steps of a first method according to the invention.

In an alternative embodiment of the method according to the invention, a single module jointly operates the functions of admission of new network slices and congestion control of the services instantiated on the network (FIG. 8-B) and in which the number of accepted services is computed so as to maximize the following function:

$$R_{AC}(s(t),a(t))=a_g(t)w_g+a_b(t)w_b-n_d(t)l_d-(K_r(t)+K_c(t)+K_m(t))l_c,$$

where $a_g(t)$ is the quantity of GS slices accepted by the admission controller, $a_b(t)$ is the quantity of BE slices accepted by the admission controller, $w_g$ and $w_b$ represent the income for each accepted GS and BE slice, respectively, $l_d$ is the cost of deleting a GS slice request, $n_d(t)$ is the number of GS slices instantaneously abandoned, $(K_r(t)+K_c(t)+K_m(t))$ describes the total quantity of communication, computational and storage resources extracted from BE slices already instantiated to instantiate additional GS slices, and $l_c$ is the associated cost to reduce the resources needed to instantiate said BE slices.

In addition, the acceptance of new GS slices is limited so as not to excessively degrade the quality of service of the BE slices already instantiated, and a minimum quantity of resources is kept on each BE slice instantiated so as to limit the overall amount of reduced resources of the BE slices.

Preferably, the control of admission and congestion of the services instantiated is done through a mechanism of reinforcement learning that is optimized by a long-term or average function of the system that takes into account the number of services accepted and the number of requests removed from the queues.

BRIEF DESCRIPTION OF THE FIGURES

Further characteristics and advantages of the invention will appear from the following description, taken by way of non-limiting example, with reference to the appended figures in which.

DESCRIPTION OF THE EMBODIMENTS

The method according to the invention will be described in the context of a cellular network management and orchestration system configured to receive service instantiation requests and to decide the network slices in which these services can be instantiated according to their types/priorities, their resource requirements, the presence of other simultaneous requests and the available network capacities which depend on the network slices already instantiated.

In the remainder of this description, the instantiation of a network slice will mean the instantiation of the applications and services likely to be provided in that slice.

Each service is instantiated in a logical network slice comprising at least two sets of virtual network function VNFs, namely a set of network functions $K^R$ corresponding to the radio access network RAN and a set of network functions $K^C$ corresponding to the core network.

One purpose of the invention is to optimize the admission control of new slices with heterogeneous priority in a network and the control of possible congestion generated by the services instantiated on these slices in order to obtain a compromise between the use of resources and the probability of refusing the instantiation of these new slices.

The invention is implemented by means of a cellular network management and orchestration system configured to receive service instantiation requests and to decide which network slices can be instantiated/accepted based on their types/priorities, their resource requirements, the presence of other simultaneous requests and available network capacities (which depend on the network slices already instantiated).

The purpose of the invention is therefore to increase the efficiency of the network, i.e. to increase the number of network slices and therefore the number of services instantiated on these slices using a given set of network resources, in order to increase the system's income.

The following description will be made in the case of slice instantiation requests on which two types of services will be instantiated, namely Guaranteed Service (GS) and Best Effort (BE) services. Each type of service is characterized by a queue which is used during the decision-making cycle for the admission of new slices. However, the invention also applies in the case of requests regarding several types of services.

In the case of the application described, it is assumed that the BE (Best Effort) slices allow the system to temporarily reduce their resources in order to manage the guaranteed Quality of Service (GS) slices, which have higher priorities and strict isolation requirements. Acceptance of services that have higher priorities and stricter requirements typically leads to higher income for the 5G system.

It is remembered that a network slice consists of a set of associated network functions that determine the quantity of resources required. For example, typical network functions in the sets RAN and NC are physical slice, routing, and caching functions. Three types of resources are required to instantiate a slice: communication (in terms of bandwidth (MHz)), computing (in GFLOPS/s) and cloud storage (in Go).

Figure 6:
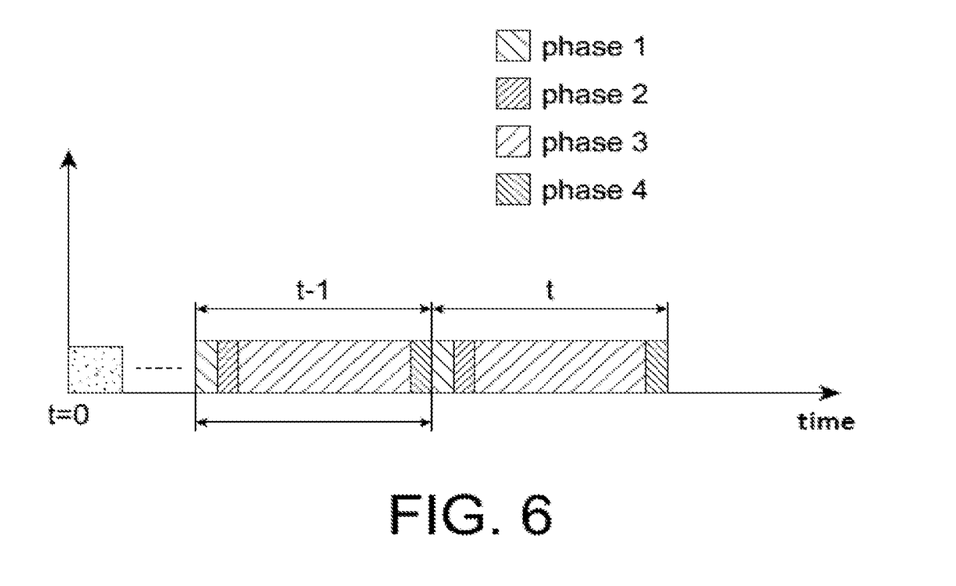
FIG. 6 represents a flow chart illustrating the decision-making cycle for network slice admission and congestion control according to the invention.

FIG. 6 schematically illustrates the different phases, phase 1 to phase 4, of the decision-making cycle for the admission of new slices to a network and for the control of congestion likely to affect traffic on the network.

At the beginning of each time interval, depending on the current states of these queues and the momentary network resources available, in phase 1, congestion control is first implemented, which allows the resources allocated to an instantiated slice to be reduced, and then in phase 2, the requests for slices to be admitted are selected. Then, during phase 3, i.e. the slice instantiation phase, network resources are allocated according to the decisions made and the accepted slices are instantiated. Finally, during the last phase 4, namely the information update phase, new requests arrive and the queues of network slices are updated accordingly. This approach makes it possible to dynamically distribute the available resources between requests for slices with different priorities.

To this end, and with reference to FIG. 7, the admission controller module and the congestion controller module operate in a coordinated manner to control a request $s_g$ for admission of at least one GS (Guaranteed Services) slice and an request $s_b$ for admission of at least one BE (Best Effort) slice, and to control the congestion of the services instantiated on said slices, the congestion controller observes the queue of requests for slices $s_g$ and $s_b$ as well as the available and used resources $s_p$ et $x_p$, and reduces, via a virtual infrastructure manager, the resource allocated to BE slices with priorities below the predefined threshold so as to increase the acceptance of GS slices with priorities above the predefined threshold.

To carry out the above operations, the total request for communication, computational and cloud storage resources of the nth slice request is defined as follows:

$$T_n = (d_{n,r}, d_{n,c}, d_{n,m})$$

The network slice congestion and admission control state space provided, denoted as S, includes sets describing states of the GS queue, the BE queue, the available network resources, the number of GS slices instantiated, the number of BE slices instantiated, and the resources allocated to the BE slices. Accordingly, S is defined as follows:

$$S = S_g \times S_b \times S_p \times U_g \times U_b \times \chi_p$$

At each time interval of the cycle provided in FIG. 4 for slice instantiation and orchestration, the number of slice requests in the GS and BE queues is respectively designated by $$s_g \in \mathcal{S}_g = \{0, 1, \ldots, Q_g\}$$

and $$s_b \in \mathcal{S}_b = \{0, 1, \ldots, Q_b\},$$

where $Q_g$ and $Q_b$ are the maximum length of the GS and BE queues respectively.

With regard to the state of network resources, the network resources available for communication, computing and cloud storage are respectively referred to as $s_p = (r,c,m) \in \mathcal{S}_p$, where $r \in \{0, 1, \ldots, R\}$, $c \in \{0, 1, \ldots, C\}$ and $m \in \{0, 1, \ldots, M\}$.

The number of GS slices instantiated, BE slices instantiated and the network resources associated with the BE slices being run are also respectively indicated in the form of: $u_g \in \mathcal{U}_g = \{0, 1, \ldots, U_g\}$, $u_b \in \mathcal{U}_b = \{0, 1, \ldots, U_b\}$ and $x_p = (x_r, x_c, x_m) \in \chi_p \subseteq \mathcal{S}_p$, $U_g$ and $U_b$ are the maximum numbers of GS and BE slices that can be simultaneously accepted by the system.

In a particular example of implementation of the invention, in order to increase the number of GS slices accepted, only the resources allocated to the BE slices will be reduced. In this case, it is not necessary to define a set related to the resources allocated to the GS slices. However, when there are several classes of slice requests, for each class whose resources can be reduced, the set of resources allocated will be defined.

Then, the numbers of new requests for GS and BE slices received at each time interval will be designated by $n_g \in \mathcal{N}_g = \{0, 1, \ldots, N_g\}$ and $n_b \in \mathcal{N}_b = \{0, 1, \ldots, N_b\}$ respectively where $N_g$ and $N_b$ are the maximum numbers of pending requests for GS and BE services respectively.

By representing the probabilities of receiving requests for GS and BE slices at a given slot by $p_n^g$ and $p_n^b$ respectively, there are:

$$\sum_{n=0}^{N_g} p_n^g = 1 \text{ and } \sum_{n=0}^{N_b} p_n^b = 1$$

It is important to note that the capacity of the queues is limited in order to avoid too long a delay for instantiation requests in the queues. Then, a slice request is deleted when it arrives in a saturated queue.

In addition, when a given layer is deleted from the network, all the resources allocated thereto are immediately released.

FIG. 8 represents a first embodiment of the invention, where the steps of the method according to the invention are implemented by an admission controller module and a congestion controller module operating in a coordinated manner to control the admission of new network slices and the congestion of the services instantiated on the network.

Congestion Control

At each time interval t (step 70), the congestion controller observes the queue of slice requests $s_g(t)$ and $s_b(t)$ as well as the available and used resources $s_p(t)$ and $x_p(t)$. According to the priorities between the different requests, the congestion controller decides (step 72) to reduce the resource allocated to the slices ($u_b(t)$) being run with low priorities (BE slices), in order to increase the acceptance of slices with higher priorities (GS slices).

For this, one way to decide how much resources to reduce to slices being run with low priorities is to maximize the following function:

$$R_C(s(t), a(t)) = a_g(t) w_g - (K_r(t) + K_c(t) + K_m(t)) l_c, \quad (1)$$

where $a_g(t)$ is the quantity of GS slices accepted by the admission controller, $w_g$ is the income generated by an accepted GS slice (note that this can be generalized to the case where each GS slice has a separate $w_g$), ($K_r(t) + K_c(t) + K_m(t)$) describes the (total) quantity of communication, computational and cloud storage resources extracted from already instantiated BE slices to instantiate additional GS slices, and $l_c$ is the cost associated with reducing BE slice resources. This cost can be related to the reduced performance of the BE slices when operating with reduced resources.

It is noted that the acceptance of new GS slices may be limited by the need not to excessively degrade the quality of service of the BE slices being run. Then, it can be considered that a minimum quantity of radio ($\delta_r$), computational ($\delta_c$) and storage ($\delta_m$) resources has to be kept on each BE slice instantiated to meet their QoS requirements. Accordingly, the overall amount of the reduced BE slice resources is limited as follows:

$$\sum_{n=1}^{a_b(t)} d_{n,r}^b + \sum_{n=1}^{a_g(t)} d_{n,r}^g \leq x_r(t) + r(t) - \delta_r u_b(t), \quad (2)$$

$$\sum_{n=1}^{a_b(t)} d_{n,c}^b + \sum_{n=1}^{a_b(t)} d_{n,c}^g \leq x_c(t) + c(t) - \delta_c u_b(t),$$

$$\sum_{n=x}^{a_b(t)} d_{n,m}^b + \sum_{n=1}^{a_g(t)} d_{n,m}^g \leq x_m(t) + m(t) - \delta_m u_b(t),$$

where $a_b(t)$ is the quantity of BE slices accepted by the admission controller.

Equation (2) describes the maximum number of GS slices that can be instantiated by recovering part of the resources from the BE slices being run. However, these requirements do not guarantee that a minimum quantity of radio ($\delta_r$), computational ($\delta_c$) and storage ($\delta_m$) resources is kept on each BE slice instantiated. To do so, it is important to contemplate a planning strategy that recovers resources from the instantiated slices. For example, when congestion control is active, resources can be taken equally from the BE slices being run.

In this case, the quantity of resources extracted from a single slice $0<n \leq u_b(t)$ is computed as follows (step 74):

$$k_{n,r}(t) = \frac{K_r(t)}{u_b(t)} \quad (3)$$

$$k_{n,c}(t) = \frac{K_c(t)}{u_b(t)}$$

$$k_{n,m}(t) = \frac{K_m(t)}{u_b(t)}$$

where $k_{n,r}(t)$, $k_{n,c}(t)$ and $k_{n,m}(t)$ respectively represent the quantity of communication, computational and cloud storage resources extracted from the nth BE slice at time slot t.

Admission Control for the Instantiation of New Slices

FIG. 8 shows a flowchart illustrating steps of this method according to the invention in which, depending on the priorities between different requests for the instantiation of new slices and resources available, the admission controller decides which and how many slices are to be accepted. In particular, at each time interval t, the admission controller selects an action $a(t)=(a_g(t),a_b(t))) \in \mathcal{A}$ that determines the number of requests $a_g(t)$ and $a_b(t)$ respectively for GS and BE slices accepted (step 76). Then, since the slice requests in each queue are served according to the first-in-first-out (FIFO) mode, the first requests $(a_g(t), a_b(t))$ are instantiated (step 78). For example, if $a_g(t)=2$, the first two slice requests in the GS queue are served. The actions chosen at each time slot have to ensure that the number of accepted BE (respectively GS) slice requests does not exceed the actual number of BE (respectively GS) slice requests in the queue:

$$a_g(t) \leq s_g(t) \text{ et } a_b(t) \leq s_b(t).$$

In addition, as described below, the requirements in equation (4) ensure that, for the accepted BE slices, the sum of the resources allocated for each type of resource is less than or equal to the current resource availability.

$$\sum_{n=1}^{a_b(t)} d_{n,r}^b \leq r(t), \quad (4)$$

$$\sum_{n=1}^{a_b(t)} d_{n,c}^b \leq c(t),$$

$$\sum_{n=1}^{a_b(t)} d_{n,m}^b \leq m(t).$$

Note that equation (4) assumes the presence of the congestion controller set forth in step 1. When this controller does not exist, equation (4) becomes:

$$\sum_{n=1}^{a_b(t)} d_{n,r}^b + \sum_{n=1}^{a_g(t)} d_{n,r}^g \leq r(t), \quad (5)$$

$$\sum_{n=1}^{a_b(t)} d_{n,c}^b + \sum_{n=1}^{a_g(t)} d_{n,c}^g \leq c(t),$$

$$\sum_{n=1}^{a_b(t)} d_{n,m}^b + \sum_{n=1}^{a_g(t)} d_{n,m}^g \leq r(t).$$

In the general case where more than two classes of slices are considered, equation (4) will include all slices for which congestion control is not used (slices for which priority is low, for example).

The objective of the admission controller is to increase the operator's income by maximizing the number of slices accepted, while limiting the probability that an incoming slice request with high priority (GS slices) will be abandoned because the queue is saturated. As a result, one way of making the instantaneous decision ($a(t)=(a_g(t),a_b(t))$) associated with a state s(t) is to maximize a function that takes into account the number of GS and BE slices accepted, as well as the number of abandoned GS requests, defined as follows:

$$R_A(s(t),a(t))=a_g(t)w_g+a_b(t)w_b-n_d(t)l_d, \quad (6)$$

where $w_g$ and $w_b$ represent the income for each accepted GS and BE slice, respectively. In addition, $l_d$ is the cost of deleting a GS slice request and $n_d(t)$ is the number of GS layers abandoned instantaneously, which can be computed as follows (step 80):

$$n_d(t)=\max\{s_g(t)-a_g(t)+n_g(t)-Q_g,0\}.$$

Time is then incremented in step 82.

Figure 9:
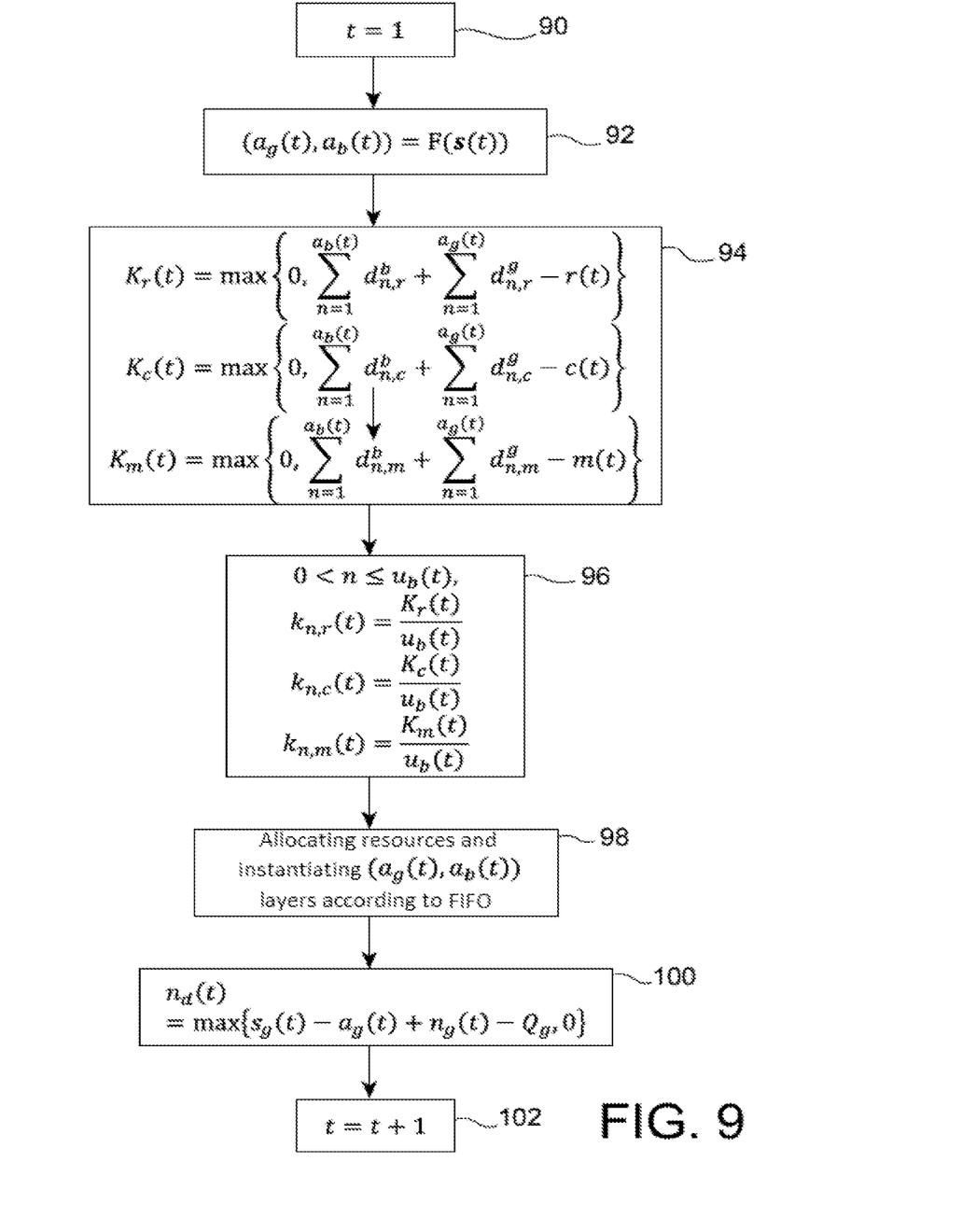
FIG. 9 represents a second flowchart illustrating steps of a second method according to the invention.

FIG. 9 represents a second embodiment of the invention, where the steps of the method according to the invention are implemented by a single controller module jointly operating the functions of admission of new network layers and congestion control of the services instantiated on the network.

Joint Admission and Congestion Control

In this embodiment, at each time interval t (step 90), the controller observes the state of the system $s(t)=(s_g(t),s_b(t), s_p(t),u_g(t),u_b(t),x_p(t))$ and decides which and how many slices are to be accepted (step 92). The controller's purpose is to increase the operator's income by maximizing the number of slices accepted, while limiting the probability that an incoming slice request with a high priority (GS slices) will be abandoned because the queue is saturated. In addition, this controller has to avoid excessive loss of QoS in instantiated slices with low priority (BS slices). For this, the action $a(t)=(a_g(t),a_b(t))$ to be taken at the time of the state s(t), can be determined by maximizing the objective function:

$$R_{AC}(s(t),a(t))=a_g(t)w_g+a_b(t)w_b-n_d(t)l_d-(K_r(t)+K_c(t)+K_m(t))l_c.$$

The total quantity of resources extracted from the BE slices via the congestion controller can be computed based on accepted slices and available resources as follows (step 94):

$$K_r(t) = \max\left\{0, \sum_{n=1}^{a_b(t)} d_{n,r}^b + \sum_{n=1}^{a_g(t)} d_{n,r}^g - r(t)\right\}$$

$$K_c(t) = \max\left\{0, \sum_{n=1}^{a_b(t)} d_{n,c}^b + \sum_{n=1}^{a_g(t)} d_{n,c}^g - c(t)\right\}$$

$$K_m(t) = \max\left\{0, \sum_{n=1}^{a_b(t)} d_{n,m}^b + \sum_{n=1}^{a_g(t)} d_{n,m}^g - m(t)\right\}.$$

As with a simple congestion controller, the quantity of resources extracted from a single slice $0<n\leq u_b(t)$ is computed as follows (step 96):

$$k_{n,r}(t) = \frac{K_r(t)}{u_b(t)}$$

$$k_{n,c}(t) = \frac{K_c(t)}{u_b(t)}$$

$$k_{n,m}(t) \frac{K_m(t)}{u_b(t)}.$$

Then, since the slice requests in each queue are served according to the first-in-first-out (FIFO) mode, the first requests ($a_g(t)$, $a_b(t)$) are instantiated (step 98).

Finally, new slice requests arrive in the system and the number of abandoned GS requests can be determined as follows (step 100):

$$n_d(t) = \max\{s_g(t) - a_g(t) + n_g(t) - Q_g, 0\}.$$

Time is then incremented in step 102.

The invention claimed is:

1. A method for controlling the admission of slices in a virtualized telecommunications network having a core network and a radio access network RAN and the congestion generated by services having different priorities instantiated on said slices and likely to share a given quantity of resources, the method comprising:
   defining a priority scale to be assigned to the slices,
   defining a low priority threshold,
   determining a quantity of available and used network resources $s_p(t)$ and $x_p(t)$,
   determining the quantity of resources allocated to slices with a priority lower than the low priority threshold and which may be temporarily assigned to new slices with a priority higher than said threshold in order to meet a quality of service requirement of the slices with the priority higher than said low priority threshold, and
   determining the slices likely to be accepted into the network, taking into account the available resources and priority of the slices,
   wherein the method further includes
      controlling a request $s_g(t)$ for at least one slice with guaranteed services, GS, and a request $s_b(t)$ for admission of at least one slice with best effort, BE, services, and controlling congestion of the services instantiated on said slices, and
      observing at each instant t by processing circuitry, a queue of slice requests $s_g(t)$ and $s_b(t)$ as well as the available and used resources $s_p(t)$ and $x_p(t)$ and reducing a resource allocated to the at least one BE slice with a priority below the low priority threshold so as to increase acceptance into the network by the processing circuitry of the at least one GS slice with a priority above the low priority threshold.

2. The method according to claim 1 wherein each slice comprises at least two sets of network functions, the two sets comprising a set of network functions $K^R$ which correspond to the radio access network RAN and a set of network functions $K^C$ which correspond to the core network.

3. The method according to claim 1 in which the quantity of resources reduced to BE slices is computed so as to maximize the following function:

$$R_C(s(t),a(t)) = a_g(t)w_g - (K_r(t) + K_c(t) + K_m(t))l_c,$$

where $a_g(t)$ is the quantity of GS slices accepted by the processing circuitry, $w_g$ is the income generated by an accepted GS slice, $(K_r(t) + K_c(t) + K_m(t))$ describes the total quantity of communication, computational and storage resources extracted from the BE slices already instantiated to instantiate additional GS slices, and $l_c$ is the associated cost to reduce the resources needed to instantiate said BE slices.

4. The method according to claim 1 in which the number of accepted slices is computed so as to maximize the following function:

$$R_A(s(t),a(t)) = a_g(t)w_g + a_b(t)w_b - n_d(t)l_d,$$

where $a_g(t)$ is the quantity of GS slices accepted by the processing circuitry, $a_b(t)$ is the quantity of BE slices accepted by the admission controller, $w_g$ and $w_b$ represent the income for each accepted GS and BE slice, respectively, $l_d$ is the cost of deleting a GS slice request, and $n_d(t)$ is the number of GS slices abandoned instantaneously.

5. The method according to claim 1 in which processing circuitry jointly operates the functions of admitting new network slices and controlling the congestion of services instantiated on the network and in which the number of accepted slices is computed so as to maximize the following function:

$$R_{AC}(s(t),a(t)) = a_g(t)w_g + a_b(t)w_b - n_d(t)l_d - (K_r(t) + K_c(t) + K_m(t))l_c,$$

where $a_g(t)$ is the quantity of GS slices accepted by the processing circuitry, $a_b(t)$ is the quantity of BE slices accepted by the admission controller, $w_g$ and $w_b$ represent the income for each accepted GS and BE slice, respectively, $l_d$ is the cost of deleting a GS slice request, $n_d(t)$ is the number of GS slices abandoned instantaneously, $(K_r(t) + K_c(t) + K_m(t))$ describes the total quantity of communication, computational and storage resources extracted from BE slices already instantiated to instantiate additional GS slices, and $l_c$ is the associated cost to reduce the resources needed to instantiate said BE slices.

6. The method according to claim 2 in which the acceptance of new GS slices is limited so as not to excessively degrade the quality of service of BE slices already instantiated, and in that a minimum quantity of resources is kept on each instantiated BE slice so as to limit the overall amount of reduced resources of the BE slices.

7. The method according to claim 2 in which admission and congestion control of instantiated services is made through a reinforcement learning mechanism.

8. A non-transitory computer-readable medium that stores a computer program that includes instructions for carrying out the method according to claim 1 when run by the processing circuitry.

* * * * *